United States Patent
Brik

(10) Patent No.: US 6,647,747 B1
(45) Date of Patent: Nov. 18, 2003

(54) MULTIFUNCTIONAL APPARATUS FOR MANUFACTURING MINERAL BASALT FIBERS

(76) Inventor: Vladimir B. Brik, 3905 School Rd., Madison, WI (US) 53704

( * ) Notice: Subject to any disclaimer, the term of this patent is extended or adjusted under 35 U.S.C. 154(b) by 227 days.

(21) Appl. No.: 09/685,204

(22) Filed: Oct. 10, 2000

Related U.S. Application Data

(63) Continuation-in-part of application No. 09/268,634, filed on Mar. 16, 1999, now abandoned.
(60) Provisional application No. 60/189,256, filed on Mar. 14, 2000, provisional application No. 60/130,456, filed on Apr. 22, 1999, provisional application No. 60/120,730, filed on Feb. 18, 1999, provisional application No. 60/078,104, filed on Mar. 16, 1998, provisional application No. 60/077,797, filed on Mar. 12, 1998, provisional application No. 60/042,384, filed on Apr. 24, 1997, and provisional application No. 60/040,602, filed on Mar. 17, 1997.

(51) Int. Cl.$^7$ .............................................. C03B 5/182
(52) U.S. Cl. .............................. 65/492; 65/502; 65/540; 65/503; 65/335; 65/374.13; 65/135.1; 65/495; 65/498
(58) Field of Search .......................... 65/498, 495, 540, 65/502, 539, 492, 503, 335, 374.13, 135.1

(56) References Cited

U.S. PATENT DOCUMENTS

| | | | |
|---|---|---|---|
| 4,957,525 A | * | 9/1990 | Gaertner et al. .............. 65/493 |
| 5,312,470 A | * | 5/1994 | O'Brien-Bernini et al. ... 65/499 |
| 5,895,715 A | * | 4/1999 | Huang ......................... 428/398 |
| 5,954,852 A | * | 9/1999 | Jensen et al. .................. 65/377 |
| 5,998,021 A | * | 12/1999 | Loftus et al. ............... 428/357 |

* cited by examiner

Primary Examiner—John Hoffmann

(57) ABSTRACT

The invention discloses a multifunctional apparatus and method to manufacture mineral (basalt) fibers to be drawn/attenuated into a continuous strand made from natural rock basalts with and without supplemental minerals. More specifically this invention discloses apparatus designed to manufacture a high quality continuous amorphous mineral (basalt) fibers with flexible/ductile properties from 7 $\mu$m to 100 $\mu$m in diameter without traces of crystalline phases which are suitable for a variety of industrial applications. The key members of apparatus are designed to provide a sequence of operations such as: mineral (basalt) rock melting in fore-chambers or retorts; volatile elements degasing and glass body mixing caused by glass body turbulence when flowing through the multi-zone sloped and in special configurations through horizontal valleys toward the collector; glass body homogenization at the collector-glass body receiver; additional glass body overheating inside upper chamber of two-chamber ceramic bushing utilizing either external induction or internal cathode-anode heating which is provided to decompose the stable complex oxides of minerals; glass body viscosity adjustment at the lower chamber of bushing and fiber formation beneath discharge wall containing orificed ceramic plates. A heat transfer water cooled fin shields conduit consisting a wall made from refractory TiNi which is a water vapor permeable porous material allowing the manufacture of amorphous fibers to be drawn/attenuated at a suitable moisture environment.

1 Claim, 5 Drawing Sheets

Multi-Functional Apparatus to Manufacture Mineral / Basalt Fibers

Multi-Functional Apparatus to Manufacture Mineral / Basalt Fibers

Multi-Functional Apparatus to Manufacture Mineral / Basalt Fibers

Multi-Functional Apparatus to Manufacture Mineral / Basalt Fibers

Multi-Functional Apparatus to Manufacture Mineral / Basalt Fibers

MULTIFUNCTIONAL APPARATUS FOR MANUFACTURING MINERAL BASALT FIBERS

CROSS REFFERENCE TO RELATED APPLICATION

This application is a continuation-in-part of U.S. patent application Ser. No. 09/268,634, filed Mar. 16, 1999, now abandoned. This application claims priority to the following U.S. provisional applications: 60/189,256, filed Mar. 14, 2000; 60/130,456, filed Apr. 22, 1999; 60/120,730, filed Feb. 18, 1999; 60/078,104, filed Mar. 16, 1998; 60/077,797, filed Mar. 12, 1998; 60/042,384, filed Apr. 24, 1997; and 60/040,602, filed Mar. 17, 1997.

TECHNICAL FIELD

The multifunctional apparatus and method related to the art of mineral fiber manufacturing from the heat softenable rock minerals such as basalts and is capable of forming fibers to be drawn/attenuated into continuous fiber strand. More specifically, the invention discloses the apparatus designed to manufacture continuous amorphous mineral (basalt) fibers from 7 μm to 100 μm in diameter with flexible/ductile properties suitable for a variety of industrial applications. Wherein basalt fiber strand made of elemental fibers from 7 μm to 20 μm in diameter is suitable to produce corrosion resistant, high-tensile strength cables/rebars and variety of fiber reinforced composites. The coarse basalt fibers from 20 μm to 100 μm in addition suitable for Three-Dimension Fiber Reinforced Composites/Concrete (3-D RFC) and many other long-term outdoor including naval industrial applications. Basalt fibers are able to maintain their properties from the cryogenic to +700C. temperatures and exhibit high corrosion resistance in acid, salt water and alkaline cement based media's. Basalt fibers are suitable also for a variety of thermal/sound insulation products which are stable at temperatures to 700C.

BACKGROUND OF THE INVENTION

The continuous glass (basalt) fiber production based on previous designs of apparatus art are subjected to failures caused by the regular catastrophic breaking of fiber filaments after the stream of glass issued from the orifices is attenuated mechanically into continuous fibers of small diameter and then grouped into a strand. Many failures occur between the bushing and the applicator: U.S. Pat. Nos. 4,957,525; 4,886,535; 4,853,017. The past efforts to reduce breakage have emphasized the feed stock as the cause and the source of the cure.

A large number of variables are present in the art of a fiber forming process which tend to create a condition that encourages filament breakage in the fiber forming zone, see U.S. Pat. Nos. 5,312,470; 4,853,017; 4,676,813; 4,664,688; 4,488,891; 4,675,039; 4,469,499. Among other negative factor on fibers (filaments) formation is the presence of unacceptable heterogeneous glass body components containing highly stable aggregates of atoms referred to as "clusters". The clusters appear as forerunners of nucleus of crystalline phases that cause a great percentage of the failures of continuous fiber made of natural rock basalt minerals. This factor appears to be permanent when the natural rock minerals (basalts) are used as initial raw material to manufacture mineral (basalt) fibers.

Previous Apparatus and Methods Art for Making Fiber

Numerous fiber manufacturing apparatus and methods have been disclosed in the U.S. Pat. Nos. 6,044,666; 5,954,852; 5,876,529; 5,800,676; 5,614,132; 5,601,628; 5,490,961; 5,458,822; 5,352,260; 5,312,470; 5,147,431; 5,134,179; 5,057,173; 4,964,891; 4,957,525; 4,950,355; 4,917750; 4,886,535; 4,853,017; 4,676,813; 4,664,688; 4,636,234; 4,534,177; 4,488,891 4,469,499; 4,437,869; 4,401,451; 4,398,933; 4,328,015; 4,199,336; 4,088,467; 4,009,015; 3,929,497; 3,854,986; 3,557,575; 3,475,147; 3,264,076; 3,048,640; 3,013,096.

The apparatus and methods which are disclosed in the above mentioned patents do not designed to manufacture a high-quality amorphous continuous mineral (basalt) fibers. In fact, these apparatus (methods) are not capable of preparing a homogeneous glass body from natural basalt rock minerals with acceptable properties. In particular, all disclosed apparatus, methods and bushings currently being in operation exhibit a drawback from the point of view of volatile elements degasing, glass body mixing and turbulence from flow. These items are important when preparing homogeneous glass body from natural rock minerals suitable to manufacture mineral (basalt) fibers in amorphous structure state. The above mentioned apparatus/methods that have been disclosed in the U.S. Patents are designed to manufacture continuous glass fibers made from silicate based materials with predetermined chemical composition or organic fiber from uniform composition rather than fibers—continuous fibers (roving) made from natural rock basalts. If fact, the basalt fiber roving production industry has not been developed in the USA. The apparatus/methods and bushings that are designed to manufacture mineral (basalt) fibers have been disclosed in the U.S. Pat. Nos. 6,044,666; 5,954,852; 5,954,852; 5,458,882; 5,312,470;5,123,949; 4,149,866; 4,636,234; 4,853,017; 4,822,392; 4,775,400; 4,560,606; 4,488,891; 4,343,637 and exhibit the same problems: poor volatile elements degasing, low-efficient glass body mixing and turbulence from flow. All these factors provide a negative impact on basalt fiber roving processing, therefore they have to be reduced (or even eliminated). Other wise it will be problem to prepare a homogeneous glass body from natural rock minerals. Homogeneous in terms of uniform chemical composition and viscosity which are suitable to produce high-quality continuous basalt fibers with appropriate amorphous structure.

The homogeneous glass body preparation in the glass and organic fiber industries utilizing silicate or organic based materials with predetermined chemical composition is more efficient when compared to that of basalt fiber processing, especially if glass fiber production utilizes boron oxide additives. The predetermined chemical composition of glass fiber production provides a great influence on apparatus or bushing design which are different from those designed to produce basalt fibers. The glass fiber processing is easier to run than basalt fiber manufacturing because of the difference in technology of glass body preparation. The glass body made from material with predetermined composition is need more simple operations to make it homogeneous. Furthermore some operations such as volatile elements degasing, glass body turbulent flowing or a high melting point complex oxides destruction are important for glass fiber processing with pre-determined chemical composition but not so much as for glass body made from natural rock materials.

Nevertheless the continuous basalt fibers processing utilizing natural rock basalts is still low cost (it could be even lower than E-glass fiber manufacturing) because basalt fiber processing utilizes the natural rock minerals—just ground rock from a quarry. For example from many quarries in the Northern Wisconsin/Minnesota. In particular from Dresser Trap Rock (Twin City) quarry. The variety of supplemental rock minerals are available for these basalts.

In addition basalt fibers exhibit attractive insulating properties which are superior to that of glass fibers. The cost effective E-glass fiber being currently on the market is lower in quality when compared to that of basalt fibers not only as insulating but also as reinforcement component for variety of composites because glass fiber contains a boron oxide (chemically active, high pollution) component which is from 8% to 12% in mass. The high diffusion mobility of boron atoms promote E-glass fiber deterioration, especially when exposed to attack by salt water or cement based alkaline media. E-glass (especially organic) fibers also tend to deteriorate when subjected to the action of the outdoor freeze-thaw and/or ultraviolet exposure. Therefore a cost effective E-glass fiber is not yet in use (on the USA market) for reinforced concrete applications. Basalt fibers, as opposed to glass fibers, do not contain even traces of boron oxide (B2O) and exhibit a Mechanical Performance/Price Ratio greater than that of any other glass fibers currently on the market.

Both Russian and Ukrainian apparatus (see 5040472/33 (1994); 92310003 (92); 4766933/00-33 (2)2 (89); 4823441/00-33 (22) (90); 4861059/00-33 (22) (90); 4793760/00-33 (22) (90) including USSR patents (990697; 937358; 881009; 874673; 589215) are referred to as similar to the present invention, because these apparatus/methods are designed to manufacture continuous fibers (roving) from the natural basalt rock materials. However the current both Russian and the Ukrainian versions of apparatus have been designed for basalt fiber industrial production exhibit some disadvantages. They are almost law efficient. The low-efficiency of glass body preparation of these apparatus come from the old stile apparatus of glass fiber production. Many features come without essential change of the key members of apparatus. The major problem of all glass fiber apparatus is a low-efficiency of high melting point complex oxides destruction. All stable high-melting point complex oxides of metals are containing in the natural rock minerals have to be decomposed and the volatile elements completely removed from a glass body. An efficient basalt glass body mixing is also needed to be accomplished.

Furthermore all previous apparatus/methods and bushings art designed to manufacture mineral (basalt) fiber exhibit lack of glass body convection at the bottom of apparatus due to a great gradient of basalt glass body viscosity at the depths. The low-infrared wave radiation transparent properties of basalt glass body causes a high gradient viscosity at depths especially when a gas burning heating system is used and positioned at the top of the apparatus—above the glass body, e.g., on the ceiling of a furnace (Russian, Ukrainian versions of apparatus). The convection and homogenization processes of basalt glass body are suppressed when the depth of bath is more than 100 mm (h>100 mm) due to the drawback of hydrodynamic characteristics. The poor hydrodynamic characteristics are typical for bath type apparatus, including straight stream glass body to flow with multi-zones horizontally extended valley of apparatus (Russian/Ukrainian versions of apparatus). The temperature of melted basalt glass body in apparatus has been disclosed in the USSR Patent No. 874673, CO3 B, 5/00.1981 and Russian Patents: RU 2017691 C1, 30.04/92) dramatically drops down at the depths with a rate of 20–25 degrees per centimeter due to a low infrared wave heat transparent property of the melted basalt glass body. The low heat transparent property causes the crystallization of basalt glass body at the bottom if an additional heating is not provided. The breakage and reduction of mechanical properties of basalt fibers (lowering in strength and flexible properties) becomes substantial for basalt fiber made of glass body with poor mixing and homogenization properties.

The traces of crystalline phases cause the brittle properties in basalt fibers especially at a the diameter greater $20\ \mu m$. Eventually coarse basalt fiber manufactured using current apparatus will at diameter greater than $30\ \mu m$ become substantially brittle and the mechanical properties of fibers dramatically reduced, that limits their applications. In fact, the Ukrainian/Russian versions of apparatus/methods referred above do not allow the manufacturing continuous amorphous basalt fibers with flexible/properties at the diameters greater than $14\ \mu m$.

The brittle properties of coarse fibers significantly limit industrial applications of basalt fiber especially for long-term Three-Dimension Fiber Reinforced Concrete (3-D FRC). The natural basalt rocks present the heterogeneous eutectic type system containing variety of complex oxides including oxides with high melting point components. Some of components that make up the natural basalt minerals exhibit congruent melting point. The congruent melting of these oxides (in accordance to phase diagram) causes an appearance of phases with melting point even greater than that of the initial components of the basalt rock mineral.

Many previous efforts related to the fiber breakage problem solving (see, for example, U.S. Pat. Nos. 4,957,525; 4,886,535; 4,853,017) were focused on an external environment action: bad sizing, rough aprons, unacceptable fan tension, cooling system, humidity, operator and other factors rather than the fundamentals of fiber structure formation. In addition natural rock minerals (basalts) in a melted state contain high-gravity iron rich components which tend to accumulate at the bottom of the apparatus. The accumulation iron rich contaminants causes damage to the orificed bushing made from precious platinum metal (or platinum based alloy) because iron and platinum (Pt) are chemically reacting metals. The accumulation of iron-rich oxides are especially high when the cathode-anode electrodes are applied as a heating system. Therefore the cathode-anode heating system cannot be applied to manufacture basalt fiber utilizing orificed bushing made of Pt, Pt—Rd based metals.

It is known that melted basalts exhibit properties essentially different than that of melted E-glass body. Basalt minerals are electrically conductive in the melted state due to presence of iron rich oxides from 8% to 15% by mass.

In summation the current apparatus and methods that have been previously developed at need dramatic improvement in terms of efficiency (energy consumption) and continuous basalt fiber failure (breakage) reduction.

All apparatus and methods that have been disclosed in the U.S. and foreign (USSR, Russian and Ukrainian) Patents as related to continuous mineral glass/basalt fibers production need dramatic improvements based on alternatives to the current design approaches. It is understood, however, that alternative approaches can be developed only if based on the fundamentals of amorphous basalt fiber formation and a practice of continuous fibers production.

The most recent apparatus and methods for forming fibers are presented in the U.S. Pat. Nos. 6,044,666; 5,954,852; 5,895,715. For example the U.S. Pat. No. 6,044,666 discloses a fiber forming apparatus for a variety melt materials utilizing insulating flow through the different configuration of bores and the bushing blocks—block assembly. A bushing block with one or more bores extending through a peripheral region thereof to divert a portion of a supply of molten fiberizable material from a central region of the bushing block to the peripheral region of the bushing block. This apparatus and method for forming fibers, however, exhibits poor volatile elements outlet during glass body distribution from the center to the peripheral bores of the bushing block. Therefore glass body turbulence inside of the bushing block bores is similar to that disclosed in U.S. Pat. No. 5,312,470. The plurality of bores (passage ways for glass body) extending through the bushing blocks are designed to produce generally continuous filaments from natural organic (non-glass substances) than from the rock minerals, in particular, natural basalt rock minerals. The system of blocks of bushing bores made of refractory materials are not designed for glass body mixing and turbulent to flow and therefore cannot be used to provide basalt glass body homogenization process.

The U.S. Pat. No. 5,954,852 discloses a method of making fiber using a cascade of rotating rotors from the melts at a viscosity of less than 18 poise at 1400C. The glass body is poured onto the top rotor at a viscosity less than 10 poise, wherein the other rotors are positioned lower. This method is not designed to make continuous basalt fibers (even a mixture of basalt and diabase melt is mentioned in this patent). The U.S. Pat. No. 5,895,715 discloses a method (blasting process) of making shaped fibers from a variety of fiberizable melt materials including such as rock slag or basalt. But blasting process cannot be used to produce continuous basalt fiber roving.

The U.S. Pat. No. 5,601,628 discloses method for production of mineral wool, particularly made of basalt melt which is fiberized by internal centrifuging in a spinner having a peripheral wall with a plurality of orifices. To produce mineral wool with good fiber fineness and largely free of unfiberized particles, the length of the filament cones and the configuration of the heated gas flows generated around the spinner are adjusted so that the majority of the filament cones emanating from the spinner orifices intersects the isoterm corresponding to viscosity of 100 poises. This enables the tips of the filament cones to reach into a cool zone, thereby increasing the viscosity at the tip of the filament cones to avoid breakage of the filament cones to be attenuated. The basaltic materials, either natural or modified basalts are available for production of rock wool. However this method is not available to produce continuous basalt fibers.

The ultra-high velocity water cooled cooper spinner method is applied to manufacture a non-continuous size mineral fibers (U.S. Pat. Nos. 4,468,931; 4,534,177) and a spinning formation fiber rotary methods (U.S. Pat. Nos. 4,724,668; 5,679,126; 4,917,725; 4,058,386) do not promote the production of continuous fiber with available properties. This method is not prevents the appearance of crystalline phase even at high speed rotations of spinner. The intrusion of high particulate fluxes into the fiber forming zone causes the reduction of high quality fiber production.

Previous Orificed Bushings Art Improvement

The industry of manufacturing glass fibers (including basalt fibers) has for many years used bushings (feeders) made of precious metals/alloys, such as platinum or platinum and rhodium based alloys. Precious metal bushings, however, tend to creep or deform in service. The creep or deformation adversely effects fiber quality. The deformation or "sag" requires the bushing to be prematurely removed from service. If corrosive affects don't take their toll on the bushing, "sag" does. In addition, platinum based alloys react with iron rich oxides.

The metallic bushings that have been disclosed at U.S. Pat. Nos. 6,044,66; 5,312,470; 5,147,431; 4,957,525; 4,853, 017; 4,676,813; 4,664,688; 4,488,891; 4,469,499 typically include a bottom plate or wall, commonly referred to in art as a tip plate, which retains a pool of molten glass associated with the furnace. The Russian and Ukrainian versions of apparatus designed to manufacture basalt fiber locate the bushings separate (outside) from the main chamber of oven, more specifically located underneath the feeders. The hydrostatic pressure of glass body in the feeders promotes molten glass to issue from the orifices of the bushing. However hydrostatic pressure tends to cause creep or "sag" to develops in the bushing at a temperature operation from 1300C. to 1350C.

The French Pat. No. 1,116,519 discloses a bushing and a feeding source of molten glass combined with rotor equipped with a slop valve. The diameter of the filaments is modified by varying the speed of the rotor and its vertical position. The bushing base is generally "V"-shaped and has a series of parallel "V"-shaped elements, at the summit of each a row of orifices provided. This particular design and placing of the glass under pressure is proposed for the purpose of preventing flooding. Small cooling fins are present on both sides of the summits of the V-shaped elements. However, it should be noted that the practical embodiment of this apparatus and its implementation on an industrial scale presents numerous difficulties, especially because of the need to utilize a rotor in the bath of molten glass in order to regulate the glass flow in an effort to inhibit the flooding.

The U.S. Patent discloses the method and apparatus for forming glass fiber. This invention provides the "dripless" type of feeders. This is accomplished by establishing a shallow layer of molten glass over an orificed discharge wall to provide the streams of molten glass for attenuation into filaments. The layer being maintained at a first level or depth to establish "non-dripless" operation during production and briefly increasing the flow of molten glass the layer to increase the layer to a second level or depth to establish "non-dripless" operation to facilitate the restart of filament formation as desired. This method and apparatus design do not relate to the many problems of basalt glass body preparation because is designed to manufacture inorganic fibers from materials with pre-determined chemical composition.

Numerous efforts have been done in the past related to the improvement of orificed bushings. The U.S. Pat. No. 5,312, 470 discloses apparatus-feeder or bushing for producing glass fiber where the heat transfer members or fin shields have outwardly disposed surfaces with a ceramic coating bonded to those surfaces. The heat transfer surfaces also are in direct contact with and adjacent to the discharge wall of the feeder where they act as support members to support the orificed discharge wall. This combination especially useful in designing feeders or bushings having a greater number of orifices.

However, the apparatus-bushing designed in this patent has very limited temperature of homogenization which in fact cannot be increased due to metallic discharge wall, which is a bottom of apparatus. These apparatus or bushing designs cannot be used to manufacture mineral (basalt) fibers from natural rock minerals which commonly contain a high melting point complex oxides of metals impurities.

The apparatus for forming glass fiber has been disclosed in the U.S. Pat. No. 5,312,470 presents an apparatus having feeder combined with discharge wall of a bushing, e.g., the bottom of a feeder is a discharge wall of a bushing containing plurality of orifices-tips. A such design of apparatus-feeder or bushing cannot be used to manufacture mineral basalt fibers from natural rock minerals because it cannot sufficiently homogenize glass body made from natural rock basalts.

In addition discharge wall of feeder or bushing is made of precious metal (Platinum-Rhodium) based alloys that limits possibility to provide glass body homogenization at temperatures greater 1400C., e.g. at temperature which needs to prepare high-quality basalt glass body even though refractory ceramic coating of orificed discharge wall of bushing is used in apparatus for forming glass fibers in the U.S. Pat. No. 5,312,470. The composite bushing is disclosed in U.S. Pat. No. 4,957,525 to reduce precious metal materials in a bushing, however the bushing has been disclosed in this U.S. Patent is made of precious Pt—Rd metals.

The development of bushings by design is disclosed in the U.S. Pat. No. 5,147,431 however utilizing precious Pt—Rd metals. The additional wall positioned above the orificed discharge wall is disclosed in U.S. Pat. No. 4,676,813 however it made of precious Pt metal. Great efforts to improve bushings characteristics have been done in U.S. Pat. Nos. 4,488,891; 4,437,869; 4,363,645 however utilizing precious metals. Some patents, for example, U.S. Pat. No. 5,312,417, disclose coatings and junctions utilizing ceramic materials (such as yttrium stabilized zircon) which exhibit an excellent thermal-shock resistance, but precious Pt metal is applied for the bushing. The list of such efforts can be easily extended. However in fact, no bushings utilizing ceramic materials have been designed yet and disclosed in the patents.

SUMMARY OF THE INVENTION

The present invention is related to a multifunctional apparatus and method, have been designed to manufacture mineral fibers made from natural basalt rock minerals having a variety of chemical compositions and petrology characteristics which are capable of forming fibers that can be drawn/attenuated into a continuous strand of containing elemental fibers from 7 $\mu$m to 20 $\mu$m in diameter with tensile strengths in excess of 350 ksi and a modulus of elasticity of 20 msi. The coarse amorphous basalt fibers with flexible/ductile properties can be produced from 20 $\mu$m to 100 $\mu$m which are suitable for long-term 3D-FRC applications.

The multifunctional apparatus and method is an efficient consisting many advantages when compared to the current apparatus and methods designed to produce continuous mineral glass including basalt fibers from the natural rock minerals.

The primary object of the invention is to provide multifuinctional apparatus is made in different modifications which are comprise the key members as follows:

a. Two fore-chamber (or retort) members have designed the ground basalt rocks (with or without supplemental minerals) melting, members associated with sloped multi-zone valley are positioned above the collector-glass body receiver.

b. Wherein each said retort comprising two different cone shape shield members: the bigger one is housing metallic shield cone and a smaller one—a ceramic cone (further referred as a tipped melting chamber). Wherein the diameter of the bigger housing metallic cone shield is adapted to the smaller ceramic cone-tipped melting chamber in such a way that a ceramic's cone size can be easily installed inside of a housing metallic cone shield, removed and replaced. Wherein a smaller ceramic tipped chamber is an extension of the metallic housing cone shield.

c. The combination of natural gas containing oxygen burning and an electric heating system members are used to melt rock minerals in a retort or in fore-chamber.

d. The fore-chamber or retort comprises a sloped valley (with adjustable angle) member having plurality zones with different depths which designed the melted mineral volatile elements to degas and glass body efficient mixing when subjected to the turbulent flowing.

e. In special embodiments (when a-high-viscosity and heterogeneous rock minerals are used) a vertical furnace of apparatus is designed comprising a stack of horizontal valley members installed inside of a furnace one beneath the other. Wherein stack of horizontal valleys is located above the collector. Wherein stack of horizontal valleys causes the glass body to cascade while flowing toward the collector. This cause the volatile elements degassing and a glass body efficient mixing;

f. The collector-glass body receiver member of the apparatus is capable of glass body homogenization and averaging of the chemical composition and viscosity;

g. A feeder, containing two sleeves members is designed to provide glass body distribution to the periphery bushings which are located beneath of each sleeve.

h. Wherein each sleeve of a feeder is connected to the collector through the step with suitable height to avoid the high-specific gravity components of glass body entrance from the collector to the bushings.

i. Wherein one central bushing is located beneath of the collector.

j. Wherein in special embodiments (when a low-viscosity basalt's are used) a horizontal type furnace of apparatus (instead vertical) is designed comprising: a fore-chamber member designed to melt the rock minerals; a sloped valley comprising zones with different depths to provide melted basalt rocks turbulent flowing that promotes the volatile elements degasing and the glass body efficient mixing; a single horizontal valley member comprises a plurality of zones with different depths capable to provide sequence operations of glass body preparation including degasing, mixture, averaging of chemical composition and viscosity, homogenization and a homogeneous glass body outlet to the feeder through the vertical tubes to the two-chamber multi-sectional ceramic bushing members.

Another object of the invention is a two-chamber maltisectional ceramic bushing member of apparatus comprising:

a. An upper chamber which subjects the basalt glass body to additional overheating treatment to decompose the stable having a high melting point complex oxides of natural rock minerals. Wherein beneath the upper chamber is located a lower chamber which is the fiber forming member. Wherein the upper-chamber of the bushing is made of electromagnetic wave transparent, high-wear and thermal-shock resistant refractory (1950C.–2100C.) ceramic materials. In particularly (but not limited to) Y2O3 stabilized Zirconia, AD-99.9%Al2O3, Cerox-1000. Wherein the upper chamber is designed glass body overheating/heat-treatment.

b. Wherein said upper chamber comprises an external induction and internal cathode-anode electrodes heating system members. Wherein the external induction or cathode-anode heating systems are used to provide glass body overheating operation to the temperature from 100 to 250 degrees C. greater than that of an average temperature inside of the collector. Wherein, as opposed to the current metallic bushings, the overheating operation is provided due to an electromagnetic wave transparent property of walls of the upper chamber of a ceramic bushing and also due to the electric conductive properties of basalt glass body.

c. Wherein for some compositions of basalt glass body a shield member made from refractory electric conductive, inert material (for example graphite) is attached to the vertical internal wall of upper chamber to increase the efficiency of the induction heating of basalt glass body. Wherein the external ultrasonic devices with determined wave frequency and amplitude positioned at the top of a bushing can be applied (but not obligatory) as addition operation to accelerate the destruction of the most stable complex oxides of minerals.

d. The lower chamber of a bushing member is designed to provide glass body viscosity adjustment to make it suitable for a stable fiber formation. Wherein the bottom of the lower chamber of a bushing comprising discharge wall comprising an electric conductive metal-ceramic composite material. Wherein a discharge wall is designed as a multi-sectional platform reinforced by ceramic trusses, wherein between the trusses are positioned ceramic plates with plurality of orifices.

e. The water cooled fin shield conduit member is associated with discharge wall comprising a vertical wall made of porous TiNi material, wherein porous are sized to maintain a suitable environment (moisture) in the zone of continuous fiber formation.

It is understood that the height and design of the vertical apparatus are depending on the natural rock composition and a glass body characteristics. Wherein some key members of apparatus can be modified or even replaced by other member, for example fore-chamber, sloped valley and stack of horizontal valley can be combined in one body block depending on the rock mineral composition and glass body properties. In particular horizontal type furnace of apparatus does not use the stack of horizontal valleys. Only one horizontally extended multi-zone valley is used instead of a stack of horizontal valleys. Wherein the length and quantity of zones of horizontal valley, the glass body passage way, are depending on the composition of basalts. For example, for highly homogeneous olivine-andesite Northern Wisconsin/Minnesota Basalts the length of horizontal valley (and the lengths of zones) can be significantly reduced. From the other hand heterogeneous gabbro NW/M basalts require the vertical type of apparatus comprising a stack of horizontal valleys. The current Russian/Ukrainian versions of apparatus designed to manufacture basalt fiber roving from a variety of petrology characteristic basalts utilizing the natural gas or liquid oil creaking products having many meters long multi-zone horizontal valley of oven.

It is understood that apparatus designed to manufacture continuous mineral (basalt) fibers from the natural rock minerals essentially differ from the apparatus designed to manufacture glass or organic fibers utilizing pre-determined chemical composition materials.

Furthermore the current apparatus designed to manufacture continuous basalt fiber (roving) utilize metallic (usually Pt, or Pt-based alloys) bushing containing limited orifices when compared to the bushings designed for glass fiber industry. It is known that the term operation of Pt bushing in basalt fiber industry is less than that in E-glass industry. The main reason is because many basalt minerals are containing the iron reach oxides which tend to react with Pt and Pt-based alloys of bushing. Therefore the development of non-metallic ceramic orificed bushings for basalt fiber industry is acute needed to provide improvement of basalt fiber roving manufacturing entirely.

The heights of upper- and a lower chamber ratio of ceramic bushing is varied depending on number of factors: basalt rock composition, glass body properties, the diameter and the quantity of elemental fibers to be drawn/attenuated.

The upper chamber of ceramic bushing is usually greater in the height than that of a lower chamber. In fact, the less the height of the lower chamber the less the hydrostatic pressure which acts on a discharge wall. The less the hydrostatic pressure the more the orificed ceramic plates can be installed into a multi-sectional discharge wall and the greater density of orifices can be made on the each of the ceramic plate. The hydrostatic pressure inside the lower chamber is associated with upper chamber through plurality of holes/openings with determined diameter which promotes to a stable fiber formation during the drowning/attenuation beneath the discharge wall.

Still another object of the invention provides a horizontal (instead vertical) modification of apparatus designed for a low-viscosity basalt minerals. The main difference of horizontal apparatus from the vertical is that the horizontal furnace of apparatus is designed to provide continuous straight stream glass body to flow though valley consisting zones with different depths which are extended through a horizontal furnace. Wherein a horizontal modification of apparatus comprising members:

a. The fore-chamber (or retort) member to provide said efficient natural rock minerals melting;

b. Sloped valley (associated with fore-chamber or retort) member comprising said plurality zones with different depths to provide melted mineral turbulent flowing;

c. One horizontal multi-zone valley, the straight stream glass body passage way is designed multi-stage basalt glass body preparation;

d. Two-chamber bushings are almost the same bushings applied for said vertical furnace of apparatus. Wherein a two-chamber bushing is used to provide glass body overheating inside of upper chamber to decompose the stable oxides, wherein the lower chamber of a bushing is designed a glass body viscosity adjustment.

Still further object of the present invention is a method of basalt fiber with flexible/ductile properties production having amorphous structure state (being from 7 $\mu$m to 100 $\mu$m in diameter). This method is based on the sequence stages of glass body preparation, e.g., the key members of apparatus operations comprising the steps of:

a. The melting of ground natural basalt rocks inside of the fore-chamber or retort members. Wherein two fore-chambers or retorts are located opposite each of other at the top of the apparatus.

b. The melted basalt glass body is subjected to turbulence during flow from the fore-chambers (retorts) downward to the collector through a sloped valley (with adjustable angle) comprising plurality zones with different depths which are able to degas volatile elements and glass body efficient mixing.

c. In specific embodiments (when a high-viscosity rock minerals are feed stock) the melted glass body flows from the fore-chamber into a stack of horizontal valleys installed inside of a vertical type furnace of apparatus. Wherein horizontal valleys are positioned each beneath the another and above the collector. These horizontal valleys are designed to provide glass body cascade while flowing downward the collector. The glass body cascading flow promotes the volatile elements degasing and glass body mixing that is more efficient than that of a sloped valley does.

d. The collector-glass body receiver is designed to provide glass body homogenization and the averaging of the chemical composition and viscosity.

e. After the homogeneous glass body is delivered from the collector to the orificed bushings through the distributor (feeder) which is comprised two sleeves. Wherein the central bushing is positioned beneath of collector. The other (four or six) periphery bushings are located beneath the two sleeves. Each sleeve is connected to the collector through steps. The height of step between collector and each sleeve is designed to prevent the entrance of high-specific gravity components to the periphery bushings. Wherein at the bottom of collector is located a valve which drains off the high gravity components from the bottom of collector.

f. Inside the upper chamber of a two-chamber bushing the additional overheating treatment of basalt glass body is provided, utilizing either induction or anode-cathode heating members to decompose the most stable complex oxides. Wherein an external ultrasonic action (with determined wave frequency and amplitude) can be used to decompose the most stable complex oxides of glass body.

g. The lower chamber of a bushing is designed to provide glass body viscosity adjustment by means of a gradual cool down from the top to the bottom of the lower chamber. Wherein the bottom of the lower chamber comprises an electric heating associated with beneath of a discharge wall which controls the temperature and fiber formation beneath the discharge wall.

h. Wherein the moisture environment underneath of discharge wall is controlled utilizing a water cooled fin shields conduit comprising a walls made of porous TiNi materials. Wherein TiNi is a water vapor permeable porous material allowing the manufacture of amorphous fibers to be drawn/attenuated at a suitable moisture environment.

It is needed to emphasize that the present method of invention, as opposed apparatus, methods and bushings are disclosed at previous Art (see Background of the Invention) is designed to manufacture continuous basalt fiber with flexible/ductile properties from a variety of basalt rock minerals. In particular (but not limited to) from the Northern Wisconsin/Minnesota including Dresser Trap Rock basalts which are found in great deposition around Lake Superior. Also these deposits (gabbro basalts) significantly extend to the South, to Kansas and to the East to include a Michigan State area. Many deposits are available as the supplemental rocks to the Northern Wisconsin/Minnesota (NW/M) basalts.

In particular NW/M and the Dresser Trap Rock-DTR (olivine, andesite, pyroxene, high-moduli acidic and Al-rich) basalts are available to produce continuous basalt fiber with flexible/ductile properties from 9 $\mu$m to 80 $\mu$m in diameter.

Yet an additional aspect of the invention emphasizes the advantage of basalt fibers from 7 $\mu$m to 100 $\mu$m in diameter with flexible/ductile properties are environmentally friendly because being made of natural basalt rocks they do not contain any traces of chemically active boron oxide which is a known hazardous component found in commercial fibers. Therefore basalt fibers are suitable for a variety of industrial applications. Wherein the industrial applications are vary depending on the diameter of continuous basalt fibers including (but not limited to):

(a)—basalt fiber strand, yam and chopped roving from 7 $\mu$m to 20 $\mu$m in diameter are suitable to produce: electric cable cords; high-temperature mineral-based matrix boards; high temperature insulators; fire resistant fabrics/textiles; inert (salt water resistant) underground drainage and pollution control filters; fiber reinforced plastics; integrated circuit boards; reinforced organic and non-organic based matrix composite/concrete; corrosion resistant high tensile strength cables/rebars (replacement of steel bar) for reinforced concrete/ composites and wood/plywood frames/trusses; a variety fiber reinforced dielectric matrix substrates; thermal and/or sound insulation and vibration suppression materials.

(b) coarse basalt fibers from 20 $\mu$m to 100 $\mu$m in diameter with flexible/ductile properties suitable for Three-Dimension Fiber Reinforced Composite/Concrete (3-D RFC); ocean going reinforced concrete oil well drilling platforms, naval construction concrete, boat and car composite frames, composite deck bridges, hybrid concrete structures, roadside guardrail beam systems, highway concrete pavements and many other engineered reinforced concrete/composite structures.

The other objects, advantages, and features of the present invention will become apparent from the following specification when taken in conjunction with the accompanying drawings.

DETAILED DESCRIPTION OF DRAWINGS

Figure 1:
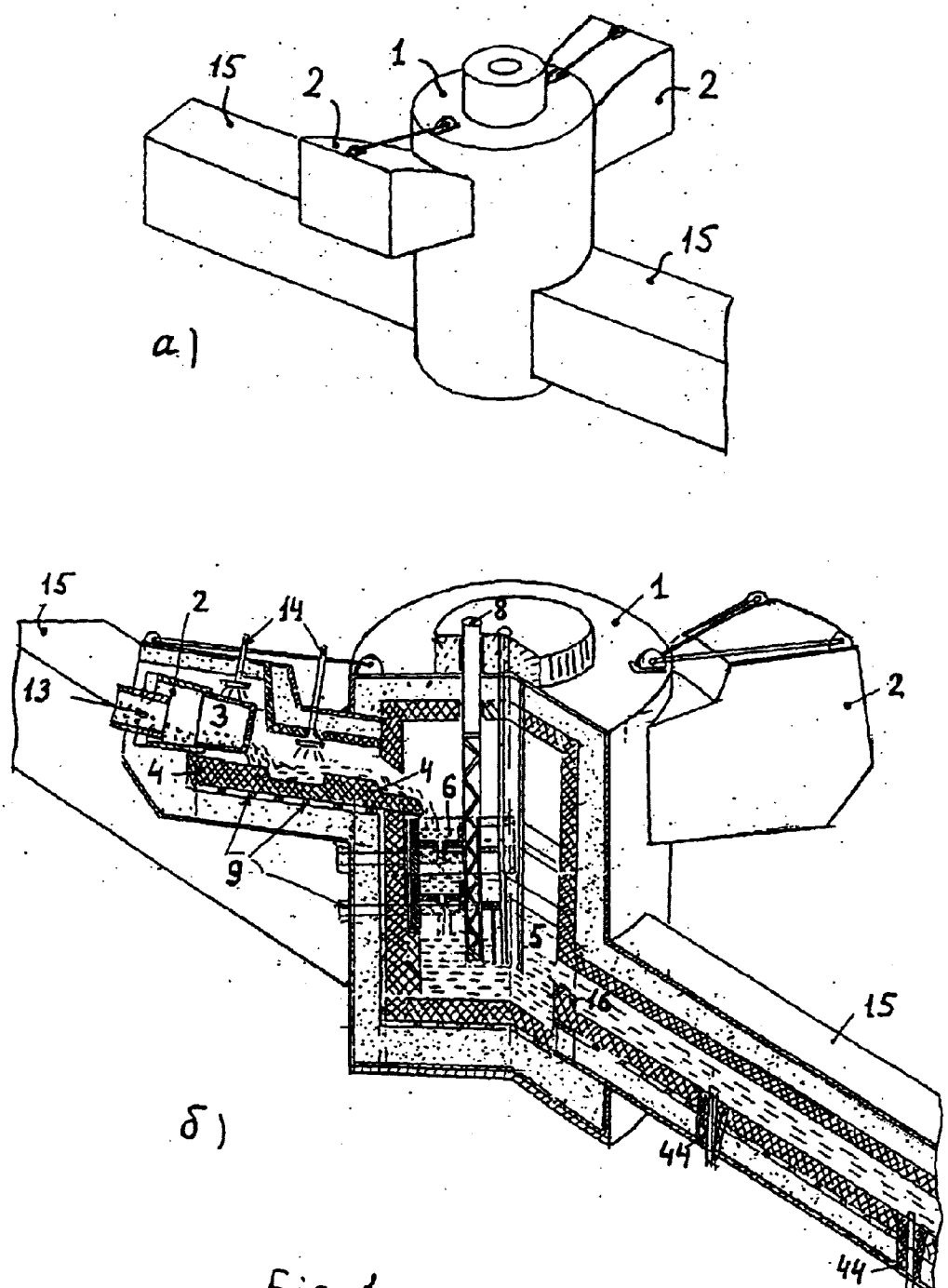
FIG. 1(a)—general view and, (b)—cross-section of vertical apparatus designed for the natural basalt rock minerals melting, glass body preparation and amorphous continuous basalt fibers manufacturing.

The vertical and horizontal multifunctional apparatus comprising the key members as follows:

1. A vertical or horizontal type furnace which are the main body of apparatus-(1);
2. The fore-chamber or retort members-(2) which are positioned at the top of the furnace of apparatus-(1). Wherein these members are designed for the melting of the ground rock basalt minerals (with or without supplemental minerals) which inlet through the loading opening-(13), wherein the melting is proceeded utilizing the natural gas burners-(14) and electric heating elements-(9).

In special embodiments (for high melting point basalt) two retorts positioned opposite each of other are used utilizing both natural gas burners-(14) and the electric heating-(9) members. Wherein each retort comprising two different cone shape shield members: the bigger one-(2) is housing cone shield made of refractory metallic material and a smaller one-(3) is cone shield (referred to as a tipped melting chamber where the melting of rock minerals proceeds) and is made of thermal-shock/wear resistant high-dimension stability refractory ceramic material;

3. Sloped valley (with adjustable angle) member-(4) is associated with fore-chamber/retort-(2). Wherein sloped valley passage way comprising steps with different depths to provide melted mineral turbulent flow;
4. In specific embodiments (for high viscosity rock minerals) the stack of horizontal valley members is located (one beneath the other) inside the furnace-(1) above the collector-(5), and is designed to cause the glass body to cascade during flowing toward the collector. The cascade flow causes the volatile elements degas and the glass body to mix efficiently.
5. A collector (referred to as glass body receiver)-(5) is designed for glass body homogenization and the averaging of chemical composition and viscosity;
6. Feeder comprising two sleeves-(15) is designed for glass body distribution to the bushings;
7. Two-chamber ceramic bushing-(20) is used to produce continuous basalt fiber roving/strand comprising members: an upper-(21) and a lower chamber-(22). Wherein an upper chamber-(21) is designed glass body overheating and high-melting point stable complex oxide destruction by heating utilizing either external induction-(23) or internal cathode-anode electrodes-(24) heating.

For some compositions of basalt glass body with poor electric conductive properties a shield member made from refractory electric conductive, inert material (for example graphite) is attached to the vertical internal wall of upper chamber to increase the efficiency of the induction heating of basalt glass body.

The ultrasonic devices-(26) can be used as an additional method to decompose completely the most stable high melting point complex oxides; The lower chamber of a busing is designed for glass body viscosity adjustment under gradual temperature reduction from the top to the bottom of a chamber under the control of the electric heating element members-(28, 41). Wherein the electric conductive metal-ceramic composite layer-(41) associated with discharge wall is located beneath of reinforced trusses-(37).

A discharge wall-(35) is associated with the bottom of the lower chamber-(22) of the two-chamber bushing comprising:

(41)—an electric conductive member which is connected with an electric heating system-(28) positioned from the both sides of a discharge wall. Wherein an electric conductive layer-(41) is located beneath of passage way-(28) and between the rows of the orificed ceramic plates-(36). The water cooled fin shield conduit members-(30, 32) are associated with a discharge wall of the lower chamber. Wherein each fin comprises a wall-(31) made from refractory TiNi intermetallic porous material.

In specific embodiments when the low viscosity rock minerals are used the horizontal furnace comprising a horizontal valley (a straight stream passage way) having zones with different depths is designed. This horizontal valley is designed to provide multi-stage glass body preparation. A horizontal modification of apparatus also comprises a fore-chamber or retort member to provide natural rock mineral melting.

A two-chamber ceramic bushing is also associated with horizontal apparatus to provide glass body overheating operation inside of the upper chamber of a bushing.

FIG. 1-*a*, shows a generic vertical type apparatus, comprising the key members: (1)—vertical furnace; (2)—two fore-chamber or retort members designed for the melting of ground rock mineral and melted mineral turbulent flow through zones with different depths; (15)—two sleeves which are associated with a feeder-glass body distributor.

FIG. 1-*b* demonstrates an internal cross-sectional view of vertical furnace-(1); two retorts-(2) which provide mineral melting operation. Wherein the melting is proceeded inside of ceramic cone-tipped melting chamber-(3) utilizing a natural gas burners-(14) and electric heating members-(9); (4)—sloped valley comprising steps with different height to provide turbulence during the flow of melted mineral toward stack of horizontal valleys and to the collector; (9)—electric heating elements positioned uniformly beneath of sloped valley-(4) and stack of horizontal valleys-(6).

(44)—glass body inlet tubes for two periphery bushings positioned beneath of a sleeve.

Figure 2:
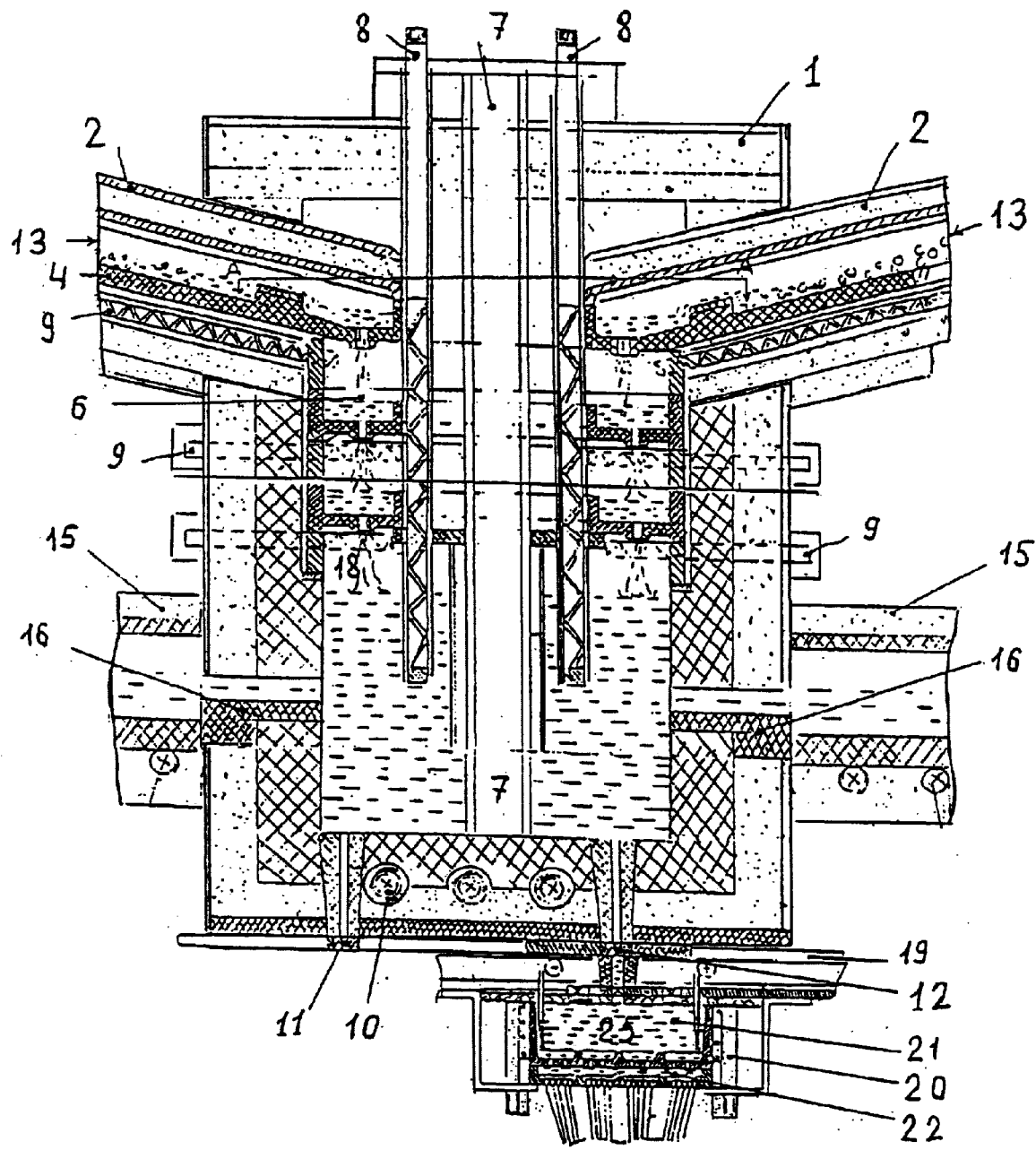
FIG. 2. Cross-section of vertical apparatus comprising two fore-chambers at the top of furnace and stack of four horizontal valleys inside of the furnace positioned above a collector to provide glass body cascade.

FIG. 2 presents a cross-section view of a vertical apparatus comprising members as follows:

(1)—vertical furnace; (2)—two fore-chambers designed for the melting of the ground rock minerals; (4)—sloped valley with adjustable angle having steps to provide turbulence during the flow of melted mineral; (6)—a stack of four horizontal valley members positioned inside of furnace located one beneath the other. Wherein each valley comprising a hole/opening at the bottom to cause glass body to cascade while flowing toward collector-(5)—basalt glass body receiver; (7)—a vertical shaft positioned inside furnace which is extended from the top to the bottom of the furnace. The vertical shaft positioned at the center of furnace is designed to support a stack of horizontal valleys and in additional to provide volatile elements outlet from the furnace; (8)—vertical electric heating members mounted at the top of apparatus and extend the length of the of a collector; (9)—electric heating elements positioned uniformly beneath of sloped and horizontal valleys. Wherein three (to five) power electric heating elements —(10) are located beneath the collector-(5); (11)—a valve designed to provide a high-specific gravity glass body components outlet from the bottom of a collector; (12)—a valve associated with vertical tube connected to glass body inside the collector and to a central bushing is designed to provide close/open operations; (13)—ground rock mineral loading opening; (15)—two horizontal sleeves-distributors of homogeneous glass body from a collector to the periphery bushings. Wherein the bottom of sleeves is positioned on the same level, that the bottom of a collector; (16)—a step is located between the collector and each sleeve to avoid the entrance of high-specific gravity contaminants from the collector to the periphery bushings; (19)—a mechanism is designed to provide open/close operations associated with the valve-(12 and a vertical tube. Wherein the closing operation of valve-(12) is provided when a ceramic bushing is needed to be removed and replaced or repaired; (20)—two-chamber ceramic bushing; (21)—upper chamber, and (22)—a lower chamber of a bushing; (25)—glass body inside upper chamber.

Figure 3:
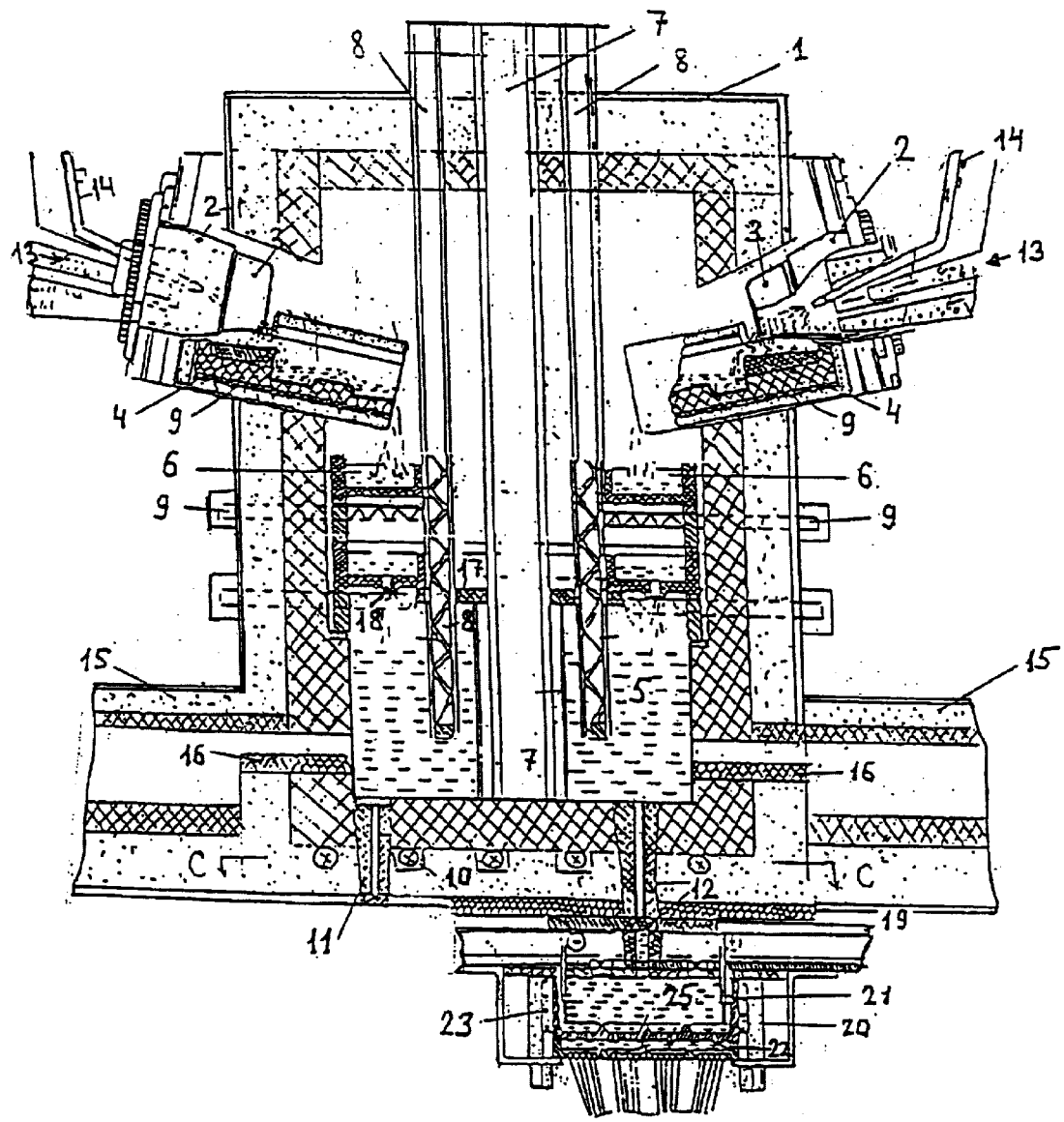
FIG. 3 Cross-section of vertical apparatus comprising two retorts at the top of furnace and two horizontal valleys positioned above a collector.

The cross-section of vertical type apparatus (similar in design to FIG. 2) is presented in FIG. 3. It comprises key members which are slightly different than those of the apparatus presented in FIG. 2. More specifically the apparatus presented in FIG. 3 comprised the members as follow: (1)—vertical furnace; (2)—two retorts capable to rotating and are designed to melt the rock minerals utilizing natural gas burning heating members. Wherein each retort comprises two different size cone shield members: bigger one housing metallic cone shield-(2) and a smaller one—a ceramic cone shield (further referred as the tipped melting chamber)-(3). Wherein the diameter of the bigger housing metallic cone shield-(2) is adapted to a smaller ceramic cone-tipped melting chamber member-(3) in such a way that ceramic cone can be easily installed inside of housing cone shield. Wherein ceramic tipped melting chamber is an extension of the housing cone shield made from refractory metallic material; (4)—sloped valleys comprising zones with different depths to provide melted mineral turbulence. Wherein beneath each sloped valley an electric heating element members-(9) are located; (6)—two horizontally valleys designed to cause the glass body to cascade while flowing; (5)—collector-basalt glass body receiver; (8)—vertically extended electric heating elements mounted at the top of the apparatus and extend the length of the inside the volume of collector; (8,9,10)—the electric heating elements; (11)—a valve designed to provide periodically a high-specific gravity glass body components outlet from the bottom of a collector.

The same like in FIG. 2, vertical tube-(12) associated with valve, is designed to provide homogeneous glass body inlet from the collector to the bushing-(20).

All other members of apparatus in FIG. 3 are designed to provide similar operations. (13)—The ground rock mineral loading opening; (14)—natural gas burners heating member; (15)—two sleeves-glass body distributors from collector to the periphery bushings; (16)—a step located between a collector and each sleeve to avoid the entrance of high-specific gravity components from collector to the periphery bushings; (17)—washer bushes made of refractory ceramic material, covering the volume of a collector to prevent the loses of the heat of glass body inside of collector; (18)—opening at the bottom of horizontal valley; (19)—a mechanism designed to provide close/open operation of a valve-(12); (20)—two-chamber ceramic bushing; (21)—upper chamber and (22)—a lower chamber of a bushing; (25)—glass body inside of upper-chamber.

In addition in FIG. 3 are presented two horizontal cross-sections of the furnace. Wherein a CC cross-section demonstrates the position of the electric heating elements-(10) beneath of collector-(5), and a cross-section DD demonstrates a mechanism-(19) designed to provide the close/open operations of the valve-(12) associated with central bushing. Wherein each periphery bushings also have a similar mechanism designed to provide the close/open operations.

Figure 4:
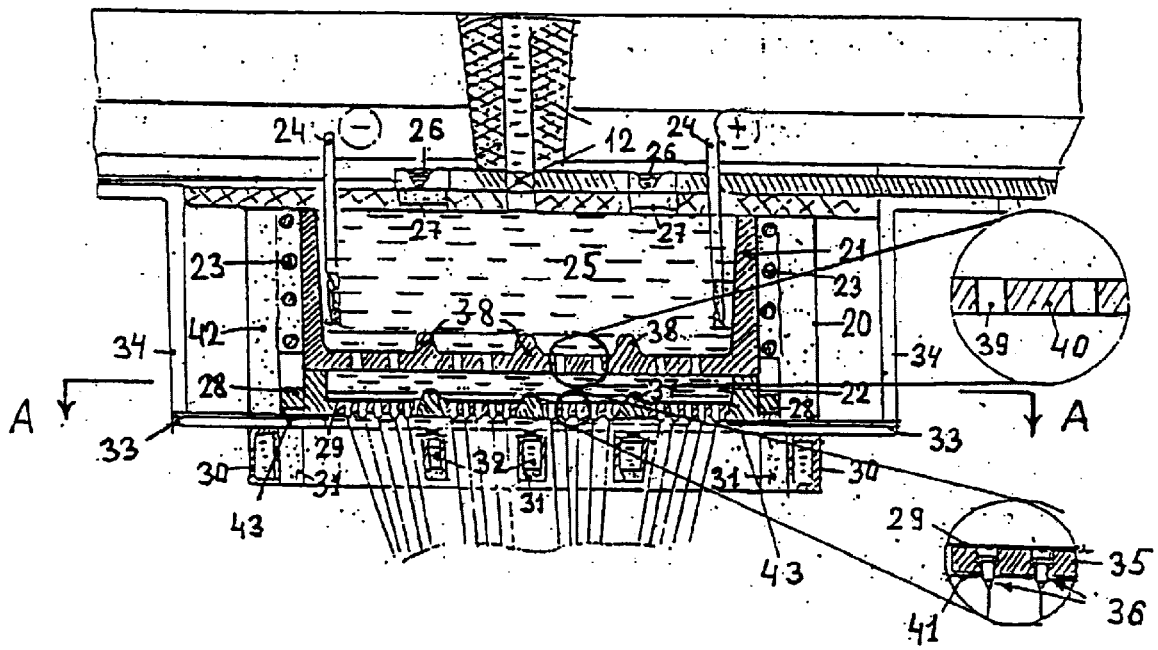
FIG. 4 Two-chamber multi-sectional orificed bushing made from refractory ceramic materials comprising an upper- and a lower chambers which include an induction and a cathode-anode heating systems designed to provide glass body overheating operation inside of upper chamber of a bushing.
Figure 4:
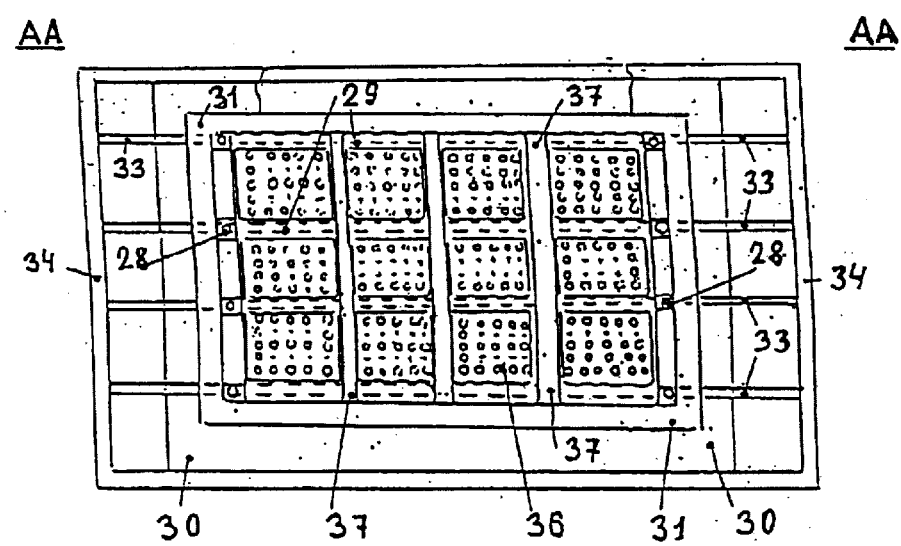

FIG. 4 demonstrates a cross-section view of a two-chamber ceramic bushing-(20). This two-chamber bushing is made from the refractory ceramics, comprising members: A vertical inlet tube associated with valve-(12); (34)—metallic frame to support a ceramic bushing; (21)—upper chamber of a bushing is designed for glass body overheating and a high-melting point stable complex oxides destruction utilizing either an external induction-(23) or an internal cathode-anode electrodes-(24) heating systems. Wherein induction heating of glass body-(25) inside of upper chamber is possible due to electromagnetic wave transparent property of vertical wall-(21) of upper chamber of bushing and electric conductive properties of melted basalt rock minerals. Wherein for some compositions of basalt glass body a shield made from refractory electric conductive inert material (for example graphite) is attached to the vertical internal wall of upper chamber, see vertical dash lines are extended close to the vertical wall of upper chamber, inside volume-(25). Wherein this electric conductive shield is used to increase the efficiency of induction heating of basalt glass body. Wherein in addition the ultrasonic devices-(26) can be used to decompose the most stable complex oxides of glass body inside of upper chamber; (25)—glass body inside of the upper chamber. Wherein the upper and the lower chambers of a bushing are made from inert, refractory, thermally shock and wear resistant ceramic materials.

(40)—The bottom of upper chamber of bushing, the intermediate platform is reinforced by the several of highly-flexural strength trusses-(38) made from refractory, inert, highly-dimensional stabile ceramic material to avoid creep "sag" of platform under glass body hydrostatic pressure. Wherein the intermediate ceramic platform has numerous of holes/opening-(39) with diameter suitable to provide hydrostatic pressure reduction. These holes/openings are designed to provide suitable glass body flowing from the upper chamber-(21) to the lower chamber-(22). Wherein the glass body flowing proceeds under hydrostatic pressure. (42)—an external thermal insulation layer of a bushing; (43)—a layer made from non-electric conductive insulation material is located between an electric conductive layer-(41) and the traverses-(33) of supporting frame-(34).

The height of a lower chamber of a bushing-(22) is designed to provide glass body viscosity adjustment under gradual temperature reduction from the top to the bottom. In addition the electric heating element members-(41) is adapted to provide temperature and viscosity control which is positioned beneath the reinforced trusses-(37) and between of the row of orificed ceramic plates-(36). Wherein electric heating metal-ceramic composite layer is associated with electric conductor member-(28).

A multi-sectional discharge wall-(35) of a bushing contains the plurality of orificed ceramic plates-(36). Wherein orificed ceramic plates are positioned between the horizontal reinforced trusses (37) are covered by an inert refractory protective layer-(29) having the same pattern of the openings as the orifices of the ceramic plates. This protective layer reduces a creep "sag" process of orificed ceramic plates under glass body chemical and hydrostatic pressure actions. In specific embodiments a tipped tubes-(36) made of Pt-platinum or Pt-based alloy set up into orifices of ceramic plates-(35) to adapt to wetting of basalt glass body.

The water cooled fin shield conduit members-(30) are associated with discharge wall of a lower chamber. The heat transfer fin shield conduit-(30) is attached to the traverses (33) of supporting frame through the low thermal conductive layer-(43). The water cooled fin shield conduit-(32) also attached to the traverses of supporting frame through a thermal insulating material. Wherein the supporting traverses-(33) made of refractory, high-flexural strength metallic material which are connected to the supporting frame (34). Wherein each fin comprises a wall-(31) made of refractory TiNi intermetallic which is a water vapor permeable porous material allowing to maintain a suitable as moisture environment at area of fiber formation.

The orificed plates of the bushing are coated by detonation gun spray utilizing a powder of the refractory materials: BN, Al2O3, TiC—NiCr, WC—Cr, WC—Nb, Ti—Mo—Zr which is selected depending on the material of the ceramic plates-substrate. The D-Gun Powder Spray processing is used to create high-adhesion coating on a ceramic material substrate.

The exterior (beneath) of the orificed ceramic plates is coated utilizing material with wetting characteristics adapted to basalt glass body. The electric conductive layer-(41)—heating element is adjacent the beneath of reinforced trusses-(37) through an adaptive metallic layer-substrate. Wherein the adaptive metallic layer is deposited onto the beneath of each reinforced trusses utilizing the D-Gun powder spray process.

The discharge wall comprising plurality of orificed ceramic plates is divided from the metallic traverses of supporting frame by means of a refractory, non-electric conductive and thermal insulating material layer-(43).

Figure 5:
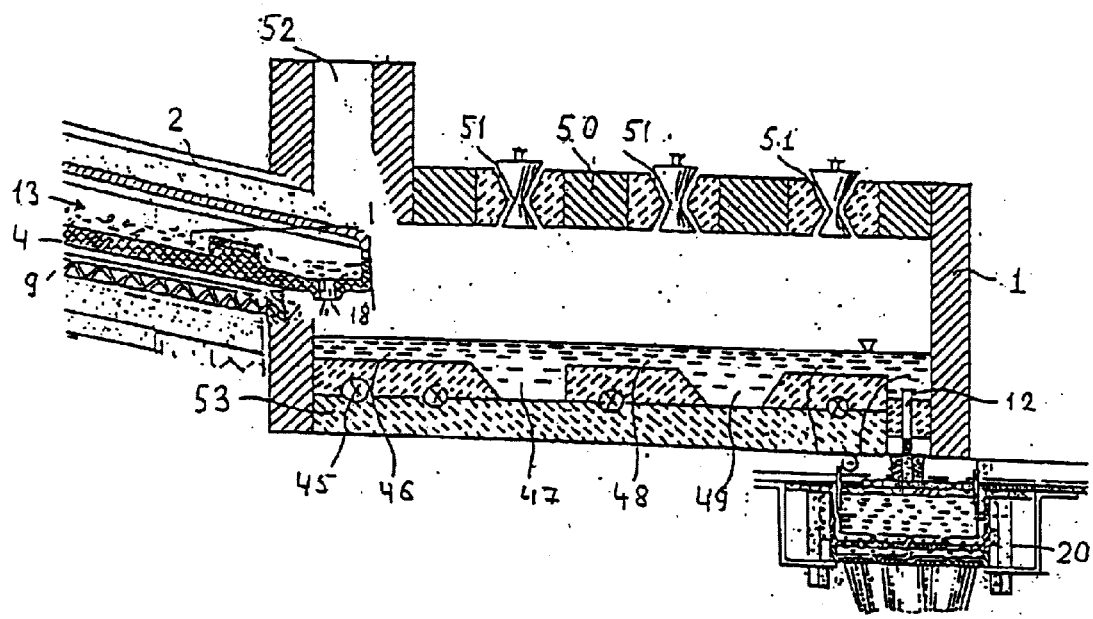
FIG. 5. The horizontal type apparatus comprising forechamber/retort to melt rock minerals, horizontally extended valley with a plurality of zones having different depths suitable to provide different stages of glass body preparation, and two-chamber bushings.

FIG. 5 demonstrates a cross-section of horizontal apparatus comprising members (1)—horizontal furnace; (2)—fore-chamber to melt rock mineral; (4)—sloped valley with adjustable angle; (9)—the electric heating elements; (12)—inlet tube to supply glass body to the bushing; (18)—opening to allow melted rock mineral to into horizontal valley; (20)—two-chamber ceramic bushing; (45)—electric heating elements; (46, 47, 48, 49)—zones with different depths; (50)—top wall of the furnace; (51)—natural gas burners heating system; (52)—volatile elements/gases outlet; (53)—bottom wall of the furnace.

Both vertical and horizontal type apparatus are designed operate at a suitable agent environment, including a low-pressure gas media inside of apparatus. As mentioned the multiifunctional apparatus is designed to melt basalt rock minerals with and without supplemental minerals which are capable of forming fiber. The supplemental rock minerals are loaded together with the ground basalt rock minerals. A suitable gas (agent) can be introduced into the vertical apparatus (if needed) through a central vertical shaft positioned inside of the oven which is extended from the top to the bottom of apparatus. A suitable sizing and or coating agent is also provided during fiber formation process.

DETAILED DESCRIPTION OF THE INVENTION

The present invention discloses an apparatus and method to manufacture mineral fibers from the volcanic rock basalt minerals (with and without supplemental minerals) are capable of forming fibers to be drawing/attenuated into a continuous strand. More specifically the invention discloses an apparatus designed to manufacture a high tensile strength continuous basalt fiber having a stable amorphous structural state at diameters from 7 $\mu$m to 100 $\mu$m utilizing natural basalt rocks with a variety of petrology, morphology and chemical composition characteristics. For example, but not limited to basalt fibers from 9 $\mu$m to 80 $\mu$m in diameter can be made from the Northern Wisconsin/Minnesota basalts including Dresser Trap Rock basalts which are found in great deposition around Lake Superior. Also these deposits (gabbro basalts) significantly extend to the South, to Kansas and to the East to include a Michigan State area. Many deposits are available as supplemental rocks to the Northern Wisconsin/Minnesota (NW/M) basalts in particular the Dresser Trap Rock (DTR) (olivine, andesite, pyroxene, high-moduli acidic, Al-rich) basalts. The NW/M including DTR basalts are suitable for the production of continuous amorphous basalt fiber with flexible/ductile properties.

THE ADVANCED CONCEPT OF APPARATUS AND ORIFICED BUSHING ART DESIGN

The advanced concept of high-quality continuous basalt fiber manufacturing is based on analysis of the previous apparatus and bushing art to facilitate basalt fiber manufacturing from the natural basalt rock minerals. This analysis has emphasized the numerous disadvantages of previous apparatus and bushing art designs that will require dramatic improvement in order to produce high-quality fibers.

It was demonstrated that a major problem the current methods of basalt fiber manufacturing from the natural rock minerals is connected with the presence of high-melting point complex oxides which are stable clusters in the liquid state. They are stable even at temperatures greater than that of the melting point of basalt rock minerals. These clusters appear as forerunners of centers of crystallization and provide great impact on the internal structural state of basalt fibers and their mechanical properties including tensile strength and ductile properties. This deleterious effect is even greater than that of surface imperfections that have been created under external surface actions. Indeed, there is critically important if basalt fibers have amorphous, quasi-amorphous structure or they have traces of crystalline phase. These fundamental terms of the structural state are responsible for basalt fiber properties. The clusters, e.g., the short ordered atom configurations of complex oxides referred to further as "aggregates" are commonly present in glass bodies made from natural basalt rock minerals. These aggregates substantially reduce the stability of the amorphous structural state. Eventually clusters appear as obstacles to amorphous structure formation and therefore reduce the unique properties of basalt fibers. Furthermore these aggregates or "clusters" can cause the clogging of the orifices of a bushing. From the metallurgical point of view these clusters present incompletely melted high melting point basalt rock components, for example, Quartz, Plagioclase, Anortite, Pyroxenes, Albite, etc.

The crystalline phases appear during the fiber drawing/attenuation process, including the early stage of fiber formation beneath the discharge wall of a bushing.

As the streams of molten glass are emitted from the orifices, fibers are still sufficiently non-viscous so that the diffusion mobility of atoms is many orders of magnitude greater than that of the amorphous structural state. A high diffusion mobility of atoms promotes the crystalline phase nucleation and growth especially when the clusters (short ordered configurations of atoms) are over a critical size. Therefore they are acting as potential centers of nucleation of crystalline phases in an amorphous structure state. In this case the time of crystalline phase nucleation at temperatures 1000C–1100C. is comparatively short, e.g., from $10^{-8}$ sec to $10^{-6}$ sec. The critical size of centers of crystallization is in range of $(4-6) \times 10^{-2}$ micrometers ($\mu$m), e.g., $(4-6) \times 10^{+2}$ Angstroms. The nucleation of crystalline phase at the temperatures from 1000C to 1100C. is significantly less than that of amorphous fiber formation—from $10^{-5}$ sec to $10^{-4}$ sec. Therefore the creation of centers of crystalline phase at 1000C–1100C. cannot be avoided when the potential centers of the crystalline phase are present in the basalt glass body. The time of nucleation of crystalline phase however can be significantly increased (by many orders of magnitude) if the size of clusters can be reduced, e.g., become less than critical <3×10 micrometers. This effect can be achieved by a short period of temperature elevation, e.g., increasing by 100–150 degree C. (centigrade) the average temperature of homogenization in collector. This overheating operation is useful even if provided shortly before the fiber formation.

Testing of the melts of Northern Wisconsin basalts has produced clusters greater than the critical size (which appear as thermodynamically stable crystalline phase centers) at temperatures in a range from 1300C. to 1350C. (depending on basalt rock composition) and can be significantly reduced if the temperature of the glass body is increased to temperature ranging from T=1450C.–1500C. The same effect can be achieved by exposure to ultrasonic action at determined wave band frequency and amplitude. High melting point complex oxides usually contain atoms of elements with the strongest chemical bonding force of interaction with oxygen atoms, for example combination of Al—O, Al—O—X atoms. In addition the clusters of iron oxides have a greater specific density and therefore they tend to accumulate at the bottom of a collector. Some clusters of atoms with strong chemical bonding force (Al—O) are highly stable in the liquid state even at temperatures above the melting point of basalts-(1280C.–1320C.). Therefore at temperatures lower 1350C the size of clusters (short ordered configurations of atoms) becomes over critical, e.g., >0.04 $\mu$m.

The periodical removal of the accumulations of high-specific gravity contaminants from the apparatus is recommended when ever basalt minerals containing a high-gravity/high-melting point components are used, for example, the Northern Wisconsin/Minnesota (NW/M) gabbro basalts. The negative impact of gabbro basalts can be reduced in the overheating operation which is provided right before the fiber formation. This operation promotes fiber amorphous structure formation. The tests of fiber made of olivine, andesite NW/M) basalts (V. Brik, "Basalt Fiber Composite Reinforcement for Concrete". IDEA National cooperative Highway Research Program. TRB/NRC Report of Investigation, NCHRP-96, 1997) have demonstrated by X-Ray diffraction pattern "Halo", that amorphous basalt fibers are significantly more diffused (more distributed by angle of X-Ray diffraction) than that of E-glass fibers. It means that the amorphous structure state of basalt fiber made of natural rock materials having complicated chemical content is more chaotic than that of E-glass fiber (with determined chemical composition including boron oxide (8%–10% mass.).

This factor reduces the probability of appearance of centers crystallization in basalt fibers made from olivine, andesite NW/M basalts. The low probability of clusters to become the centers of crystallization promotes amorphous structure formation with specific longitudinal chains of the high chemical bonding force elements such as: Al—O—Al; Al—O—Al—Fe—Al—O. These high strength chains of longitudinal configurations of atoms are embedded into amorphous structure state. The combination of amorphous structure state with longitudinal chains Al—O—Al or other composition of elements creates a unique composite structure state of basalt fiber.

It is important to emphasize that preliminary research has shown that elevation of the temperature inside of apparatus is desirable but not absolutely necessary for clusters destruction. A local overheating treatment of glass body can be provided instead. The greater the heating above the average temperature of glass body homogenization the greater the rate of the stable complex oxides destruction. This final overheating operation at a small volume is more economic than increasing the temperature glass body homogenization inside of collector. The closer to a zone of fiberization the volume of glass body to which the overheating operation is provided the more effective this final operation. It is better if the overheating operation is provided right before fiber formation.

The current apparatus/methods and bushings that have been disclosed in the U.S. Patents are not designed for the temperature elevation even it a small volume, first of all because the current apparatus and bushings are combined in one volume. In addition these apparatus or bushings utilize the precious Pt based alloys which cannot withstand the required temperature elevation. This problem is faced by all current apparatus and methods that have been designed to manufacture mineral fibers utilizing raw material with pre-determined composition.

Many efforts have been provided to reduce the temperature of apparatus operation in the E-glass fiber industry and the boron acid additive in range from 8% to 12% (mass.) is one of such effort. However small boron atoms exhibit high-diffusion mobility in amorphous structural state that reduces the free energy of crystalline phase nucleation. This promotes the deterioration of fiber. Therefore E-glass fiber are not suitable yet for a long-term applications, particular fiber reinforced concretes.

This analysis of apparatus/methods, bushings art design and fundamentals of amorphous fiber formation provides a concept of how to improve the design of apparatus and bushings. In particular it emphasizes the importance of the sequence of operations of the key members of apparatus designed to manufacture continuous basalt fiber from natural basalt rock minerals. This concept is disclosed at V. Brik U.S. Patent pending application Ser. No. 09/268,634 filed Mar. 16, 1999. Class 065. Foreign Filing License Granted Apr. 19, 1999; and at the Provisional Patent Applications: 60/120,730 (Feb. 18, 1999); 09/298,634 (Mar. 16, 1999).

The present invention of multi-functional apparatus and method of continuous mineral/basalt fiber manufacturing comprising the key members as follows:

a. Two fore-chamber (or retort) members designed for the efficient melting of ground basalt rocks (with or without supplemental minerals) positioned at the top of apparatus, and above the collector. Wherein said retort member comprising two cone shape shield members which are different in size: the bigger one-housing metallic cone shield and a smaller one is a ceramic cone shield (tipped melting chamber). Wherein the diameter of the bigger housing metallic cone shield is adapted to the smaller ceramic cone (tipped melting chamber) in such a way that a size of ceramic cone shield is suitable to be set up easily inside of the housing metallic cone shield;

b. Wherein the melting of the rock minerals proceeds inside of a ceramic cone-melting tipped chamber. Wherein a combination of natural gas with oxygen and the electric heating members are used;

c. Wherein each fore-chamber or retort member comprises a sloped valley (with adjustable angle) member having.zones with different depths which are designed the melted basalt mineral turbulent while flowing that causes volatile elements to degas and glass body to efficient mixing;

d. In special embodiments, when the high-viscosity heterogeneous minerals are used, a vertical apparatus is designed comprising a stack of horizontal valleys which is located inside of furnace above the collector. Wherein horizontal valleys cause the glass body to cascade while flowing toward collector that cause the volatile elements degasing and glass body efficient mixing;

e. The collector-glass body receiver member of the apparatus is capable the glass body homogenization and averaging of chemical composition and viscosity;

f. A feeder containing two sleeves members is designed to provide glass body distribution to the periphery bushings which are located beneath of each sleeve;

g. Wherein two sleeves (feeders) members are connected to collector through the step with suitable height to avoid the entrance of the high-specific gravity components from the collector to the bushings;

h. Wherein the central bushing is located beneath of the collector;

i. Wherein in special embodiments (when the low-viscosity basalt's are used) a horizontal type furnace of apparatus is designed comprising: fore-chamber or retort member designed the efficient rock minerals melting; a multi-zone sloped valley member designed to provide melted basalt rocks turbulent during flowing that causes the volatile elements degasing and glass body efficient mixture.

The horizontal valley of horizontal apparatus having the plurality zones with different depths designed to provide sequence stages of glass body preparation including degasing, mixture, averaging of chemical composition and viscosity and homogenization, homogeneous glass body delivering to the bushings through the vertical tubes.

Another object of the invention provides a two-chamber multi-sectional ceramic bushing member of the apparatus comprising:

a. An upper chamber which subjects the basalt glass body to additional treatment overheating to decompose stable complex oxides of natural rock minerals having high melting points and a lower chamber which is the fiber forming member. Wherein the upper-chamber of the bushing is made of electromagnetic wave transparent, high-wear and thermally-shock resistant refractory (1750C.–2400C.) ceramic materials. In particularly (but not limited to) Y2O3 stabilized Zirconia, AD-99.9%Al2O3, Cerox-1000. Wherein upper chamber is designed for glass body overheating.

b. Wherein said upper chamber comprising an external induction and an internal cathode-anode electrodes heating system members which are located outside and inside of upper chamber of bushing respectively. Wherein the external induction heating is used to provide glass body overheating operation to 100–250 degrees C. greater than that of the average temperature inside of the collector. Wherein the overheating operation can be provided due to electromagnetic wave transparent property of vertical walls of upper chamber of ceramic bushing and also due to electric conductive properties of basalt glass body. Wherein for some composition of basalts a shield made of refractory electric conductive inert, for example, graphite (but not limited) is attached to the internal side of a vertical wall of the upper chamber of a busing. Wherein said shield is used to make induction heating of basalt glass body more efficient especially when basalt glass body exhibit poor electric conductive property. Wherein an external ultrasonic devices (with determined wave frequency and amplitude) are also can be used to decompose the most stable complex oxides of glass body.

c. The lower chamber of a bushing member is designed to provide glass body viscosity adjustment which has to be suitable for fiber formation. Wherein the bottom of the lower chamber of a bushing comprising a discharge wall made of electric conductive metal-ceramic composite material.

Thus, the method of the invention is based on the sequence of operation of the key members of the apparatus have been designed to manufacture continuous amorphous fibers from 7 μm to 100 μm in diameter comprising the steps of:

a. The melting of ground natural basalt rocks inside of fore-chamber (or retort) which are located at top of the apparatus and positioned opposite each of other.

b. The melted basalt glass body which is turbulent while flowing from the fore-chambers (retorts) through a sloped valley (with adjustable angle) with zones having different depths, which causes a glass body to efficiently mix and release the volatile elements, e.g., degas.

c. In specific embodiments, when high-viscosity minerals are used the melted glass body-flows from fore-chamber/retort into a stack comprising several horizontal valleys positioned inside of the vertical apparatus. These horizontal valleys are located one beneath the other and are above the collector. They are designed to cause glass body to cascade while flowing downward to the collector. The cascade flow promotes the glass body volatile elements to degas and efficient mixing.

d. After leaving the valleys the glass body enters into the collector—a glass body receiver designed for glass body homogenization and the averaging of the chemical composition and viscosity.

e. The homogeneous glass body is delivered from the collector to the periphery bushings by means of the feeder-distributor comprising two sleeves. Wherein each sleeve is connected to collector through the step. Wherein the height of the step is designed to prevent the transfer of high-specific gravity components from collector to the periphery bushings. The central bushing is positioned beneath the collector. The other (four or six) periphery bushings are located beneath the sleeves.

f. Wherein a glass body overheating treatment in the upper chamber of a bushing is provided by utilizing either cathode-anode current flow through basalt glass body or external induction heating. The overheating is provided to decompose the clusters and to promote the formation of amorphous structural state of the basalt fiber, to maintain the flexible/ductile properties of fiber, which include coarse basalt fibers suitable for 3D-FRC applications.

g. The lower chamber of a bushing is designed to provide adjustment of glass body viscosity by gradual lowering of the temperature of the glass body from the top to the bottom. Wherein, the adjustment of glass body viscosity is necessary for the manufacture of continuous basalt fiber in an amorphous structural state. Wherein the glass body cones are formed beneath of a discharge wall in a suitable moisture and sizing agent environment. The moisture environment is controlled by a water cooled shield conduit containing a vertical wall made of porous TiNi materials.

Still other aspect of the invention is that almost all members of the multifunctional apparatus can be easily removed, repaired or replaced without termination of the process, especially those key members which operate in the harsh conditions that can cause the damage to these members. These removable members of apparatus are as follows:

a. Each retort is comprised of two cone shields: the bigger one—housing metallic cone shield and a smaller one—a ceramic cone shield (referred to as the tipped melting chamber) where the melting of basalt rocks proceeds. Wherein both cone shields are designed in such a way that in the case of damage to the ceramic cone shield-tipped melting chamber (operating in harsh thermal shock conditions, e.g., more harsh than that of the metallic cone shield) can be easily removed from the metallic cone shield if it needs to be repaired or even replaced. To provide for this operation one retort has to be removed from apparatus, but the other retort is able to keep operating to supply melted rock mineral to the collector. After repair or replacement of the damaged ceramic cone shield (tipped melting chamber) the retort (which has been removed from apparatus to be repaired) is set again into operation.

b. The same idea, of the possibility to remove and to replace a key member of apparatus is presented in a design of a two-chamber multi-sectional ceramic bushing. As described above the lower chamber of a bushing operates in the extremely harsh conditions which cause damage to this chamber more frequently than that of upper chamber of a bushing. In this case the damaged lower chamber, more specifically orificed ceramic plates need to be removed, and replaced. This operation is provided when a housing upper chamber of a bushing still remains in place, wherein the valve associated with the collector and the upper chamber of a bushing is closed during replacement of the lower chamber.

The multi-sectional discharge wall design allows the removal/replacement of the broken or damaged ceramic plates when the other ceramic plates which are in a good condition remain as they are in the discharge wall.

c. A further advantage of the invention is connected with the combination of the induction and the cathode-anode heating systems associated with upper chamber of a bushing. The induction and cathode-anode heating systems can be also easily removed, repaired/replaced when the tube valve associated with upper chamber is closed.

What is claimed is:

1. An apparatus having a vertically or horizontally extended furnace for forming mineral fibers of a diameter between 7 and 100 microns, wherein the apparatus comprises:

(a) a vertically oriented furnace having a first side, and a second side opposite the first side, wherein said furnace can be modified to oriented horizontally having one side, and wherein horizontally oriented furnace having one melting chamber comprises horizontally extended zones with different depths to provide one direction glass body passage way turbulence flow;

(b) first and second melting chambers, wherein the chambers are at the top of the furnace and wherein the first chamber is positioned at the first side and the second chamber is positioned at the second side, wherein said first and second chambers of vertically oriented furnace are mounted stationary or can be modified to rotating retorts to provide efficient melting of basalt rocks containing high-gravity, high viscosity components, and wherein said one side chamber of horizontally oriented furnace is mounted stationary above zones of glass body passage way flow level;

(c) a first adjustable sloped valley member under the first melting chamber, and a second adjustable sloped valley member under the second melting chamber of said of vertically oriented furnace comprises zones with different depths to provide efficient mixing of melted basalt rocks;

(d) a vertical stack of horizontal valley members of vertically oriented furnace, wherein each horizontal valley member has an opening to permit molten material to cascade down the stack, and wherein the valley members have various heights to promote efficient mixing and degassing;

(e) a glass collector member for receiving the molten material from the stack and homogenization basalt rock glass body;

(f) two horizontally forehearths for receiving the molten material from the collector member having additional heating elements to deliver homogeneous glass body at proper temperature to the bushings;

(g) a raised throat which retains higher-density glass components in the collector member and permits the passage of suitable density glass body to forehearts and to the bushings;

(k) two-chamber ceramic bushings associated with in each of the forehearths, wherein each bushing comprises plurality ceramic plates with orifices, wherein each bushing comprises two chambers: upper—fore and lower chamber, wherein upper—fore chamber of said bushing is associated with inlet tube attached to the collector and the lower chamber is associated with withdraw orificed plates, wherein fore—chamber of a ceramic bushing permits additional glass body heat-treatment right before withdraw from lower chamber to form plurality of fiber, and wherein each bushing further comprises water-cooled fins comprising TiNi intermetallic walls, wherein the TiNi a water vapor permeable; and (h) each said members of multifunctional apparatus operation is designed to manufacture amorphous fibers with ductile properties utilizing natural basalt rocks having a variety properties—different chemical composition and petrology characteristics.

* * * * *